(12) United States Patent
Zhao et al.

(10) Patent No.: US 12,305,762 B2
(45) Date of Patent: May 20, 2025

(54) SEALING PACKING

(71) Applicant: AIGI ENVIRONMENTAL INC., Jiangsu (CN)

(72) Inventors: Jingwei Zhao, Jiangsu (CN); Jun Zhang, Jiangsu (CN)

(73) Assignee: AIGI ENVIRONMENTAL INC., Jiangsu (CN)

( * ) Notice: Subject to any disclaimer, the term of this patent is extended or adjusted under 35 U.S.C. 154(b) by 0 days.

(21) Appl. No.: 18/601,236

(22) Filed: Mar. 11, 2024

(65) Prior Publication Data

US 2024/0426380 A1 Dec. 26, 2024

(30) Foreign Application Priority Data

Jun. 21, 2023 (CN) .......................... 202310745861.1

(51) Int. Cl.
*F16J 15/44* (2006.01)

(52) U.S. Cl.
CPC ..................... *F16J 15/44* (2013.01)

(58) Field of Classification Search
CPC ........................................................ F16J 15/44
See application file for complete search history.

(56) References Cited

U.S. PATENT DOCUMENTS

| | | | | | |
|---|---|---|---|---|---|
| 3,646,846 | A | * | 3/1972 | Houghton ................ | D04C 1/02 277/537 |
| 4,949,620 | A | * | 8/1990 | Swan ...................... | F16J 15/22 87/8 |
| 2013/0307229 | A1 | * | 11/2013 | Veiga ....................... | D04C 1/12 277/652 |
| 2014/0084546 | A1 | * | 3/2014 | Starbile ................... | D04C 1/06 277/537 |
| 2023/0132709 | A1 | * | 5/2023 | Kennedy ................ | F16J 15/104 277/616 |

FOREIGN PATENT DOCUMENTS

| | | | |
|---|---|---|---|
| CN | 215673591 U | 1/2022 | |
| GB | 2255141 A | * 10/1992 | ............... D04C 1/02 |

\* cited by examiner

*Primary Examiner* — Vishal A Patel
(74) *Attorney, Agent, or Firm* — Volpe Koenig

(57) ABSTRACT

A sealing packing includes a core portion and a housing wrapped around the exterior of the core portion that has a rounded rectangular cross-sectional shape. The housing comprises a plurality of fiber threads woven together with each other and a barrier sealant filled between the plurality of fiber threads. Between the core portion and the housing, a lubricating layer covers the housing. The core portion has a cross-sectional area of 15-75% of the cross-sectional area of the sealing packing. The core portion comprises a central supportive reinforcing core with an X-shaped cross-section and a plurality of elastic supplementing cores. The central supportive reinforcing core has a central portion extending along the central axis of the core portion and four support portions extending outwardly from the central portion. Each support portion points to a respective corresponding corner of the housing. A method for preparing the sealing packing is also provided.

18 Claims, 5 Drawing Sheets

SEALING PACKING

CROSS-REFERENCE TO RELATED PATENT APPLICATION

This application claims the benefit of Chinese Patent Application No. 202310745861.1, filed Jun. 21, 2023, the entire contents of which are hereby incorporated by reference in their entirety.

TECHNICAL FIELD

The present application belongs to the field of fluid sealing technology, and specifically relates to a sealing packing and a preparation method thereof.

BACKGROUND

In many types of machinery and equipment, packing is an important component used to prevent leakage of liquids or gases. They are usually made of materials that are resistant to wear, heat and chemicals. Packings can be customized in shape and size to suit a wide range of different equipment and applications, for example, for sealing pumps, valves, heat exchangers, and so on.

At present, there are many types of packing, and most of them are made of woven fiber threads, such as PTFE fiber packing, aramid fiber packing, carbon fiber packing, ramie fiber packing and so on. The advantages of such packing are simple processing, easy to use, inexpensive, widely used, the disadvantage is that the compression deformation is large, single performance, not enough strength, wear bushings, not corrosion-resistant.

In order to enhance the resilience, pressure resistance and long-lasting sealing performance of the packing, rubber threads can be added between the fiber threads or the packing can be braided with rubber threads, which are thicker than the fiber threads, as the core threads. Such improvements can help to improve the resilience performance of the packing and can partially alleviate the sealing problem at low temperatures and pressures under good service conditions, but will be of little help at higher temperatures and pressures or under poor service conditions. In the above cases, there is still the problem of short sealing cycle due to the insufficient compression resistance, resilience and abrasion resistance of the packing. The corners of the packing are especially prone to deformation under extrusion, and this deformation becomes particularly rapid under pump shaft beating or in abrasive media, resulting in the loss of the original shape of the four corners of the packing and a drastic reduction in sealing performance and eventual failure.

One of the main areas of application for packing is the sealing of pumps on conveyor lines. These machines are usually in continuous operation under complex and changing conditions and therefore have high demands on the safety, reliability and lifetime of the seals. There is a need to develop a packing with improved performance to meet these requirements.

SUMMARY

The purpose of the present application is to overcome the deficiencies in the prior art and provide a sealing packing which has the characteristics of small extrusion deformation, high resilience performance, strong compression resistance, wear resistance, corrosion resistance, and self-lubrication, and which is capable of providing highly efficient sealing and long-term stable operation of the equipment to be sealed.

The present application proposes a sealing packing for producing a seal between an apparatus housing and a drive shaft, wherein the sealing packing comprises:
a core portion;
a housing which is wrapped around the exterior of the core portion and has a rounded rectangular cross-sectional shape, wherein the housing comprises a plurality of fiber threads woven together with each other, and a barrier sealant filled between the plurality of fiber threads and between the core portion and the housing; and
a lubricating layer which covers the housing,
characterized in that
the core portion has a cross-sectional area of 15-75% of the cross-sectional area of the sealing packing;
the core portion comprises a central supportive reinforcing core with an X-shaped cross-section and a plurality of elastic supplementing cores;
the central supportive reinforcing core has a central portion extending along the central axis of the core portion and four support portions extending outwardly from the central portion;
each support portion of the central supportive reinforcing core points to each corresponding corner of the housing.

According to an optional embodiment, the lines connecting the ends of adjacent support portions of the central supportive reinforcing core are substantially parallel to the outer edge of the sealing packing.

According to an optional embodiment, the elastic supplementing core is arranged between each two adjacent support portions of the central supportive reinforcing core and abuts against these two support portions to form, in combination with the central supportive reinforcing core, the core portion having a X-shaped cross-sectional shape.

According to an optional embodiment, the center portion of the central supportive reinforcing core has a through-hole extending along the center axis of the core portion.

According to an optional embodiment, the elastic supplementing core has a circular, oval, rectangular, wedge or triangular cross-sectional shape.

According to an optional embodiment, the central supportive reinforcing core and the elastic supplementing core have different hardnesses from each other.

According to an optional embodiment, the hardness of the central supportive reinforcing core is at least 5 degrees higher than the hardness of the elastic supplementing core in terms of Shore A hardness.

According to an optional embodiment, the central supportive reinforcing core is made of one material or a combination of materials of silicone rubber, fluorosilicone rubber, polyurethane rubber, fluoroelastomer, ethylene propylene rubber, nitrile rubber, hydrogenated nitrile rubber, neoprene rubber; and
the elastic supplementing core is made of one material or a combination of materials from among silicone rubber, fluorosilicone rubber, polyurethane rubber, fluoroelastomer, ethylene propylene rubber, nitrile rubber, hydrogenated nitrile rubber, neoprene rubber.

According to an optional embodiment, the fiber thread is made of one or more of spandex fibers, carbon fibers, PTFE fibers, plant fibers, graphite fibers; and the barrier sealant is made of graphite or PTFE.

The present application further proposes a method for preparing the sealing packing, characterized in that the method comprises the steps of:

S1: Combining the central supportive reinforcing core and the elastic supplementing core and pretreating the fiber thread;

S2: Loading the pre-treated fiber thread 110 and the combined central supportive reinforcing core 100 and elastic supplementing core 101 into a machine for braiding, and prefabricating the rope-like structure with the central supportive reinforcing core 100 and the elastic supplementing core 101 as the inner core and the fiber thread 110 as the housing, and reserving a processing allowance;

S3: Impregnating the rope-like structure in step S2 in the barrier sealant 111 then removing for drying;

S4: Loading and braiding the rope-like structure from step S3 to form a sealing packing 1 comprising a core 10 and a housing 11;

S5: Impregnating the sealing packing 1 from step S4 in a lubricant then removing to dry to form a lubricating layer on the exterior of the housing 11.

The sealing packing according to the present application has the following advantages.

Deformation resistance: The support section of the center support core that extends towards the corners of the housing greatly enhances the resistance to deformation of the corners of the sealing packing under vibratory conditions, allowing the sealing packing to maintain the original shape of the corners and sealing even under pressure fluctuations, pump shaft runout or in abrasive media.

Abrasion resistance: The shell and lubrication layer enable the sealing packing to resist friction at the sealing interface. Wear-resistant packing maintains an effective seal at high pressures and speeds.

Temperature resistance: The materials used in the core and shell allow the sealing packing to maintain its physical and chemical properties over the temperature range in which it operates. This includes resistance to thermal expansion due to high temperatures or contraction due to low temperatures.

Chemical resistance: The materials of the core and shell allow the sealing packing to resist corrosion from chemicals to which it may be exposed. This may include the fluid itself, as well as chemicals used to clean or maintain the equipment.

Compression resilience: The combination of a central supportive reinforcing core and an elastic supplementing core gives the sealing packing adequate and good compression resilience, which helps the packing to adapt to minor surface irregularities during installation, and also makes it easy to form an effective seal when compressed, maintaining a long-lasting seal even at low preloads or during pressure changes.

BRIEF DESCRIPTION OF THE DRAWINGS

The foregoing and other aspects of the present application will be more fully understood from the foregoing detailed description and in conjunction with the following drawings. It should be noted that the proportions of the accompanying drawings may differ for purposes of clarity, but this will not affect the understanding of the present application.

DETAILED DESCRIPTION

Exemplary embodiments of the present application will be described in greater detail below with reference to the accompanying drawings. Although exemplary embodiments of the present application are shown in the accompanying drawings, it should be understood, however, that the present application may be realized in various forms and should not be limited by the embodiments set forth herein. Rather, these embodiments are provided to enable a more thorough understanding of the present application and to convey the full scope of the present application to those skilled in the art.

It should be noted that when an element is said to be "fixed to" or "arranged on" another element, it may be directly on the other element or indirectly on the other element. When an element is said to be "attached" to another element, it may be attached directly to the other element or indirectly to the other element.

It is important to understand that the terms "length", "width", "top", "bottom", "front", "rear", "left", "right", "vertical", "horizontal", "top", "bottom", "inside", "outside" and the like indicate orientations or positional relationships based on those shown in the accompanying drawings, and are intended only to facilitate the description of the present application and to simplify the description, and are not intended to indicate or imply that the device or element referred to must have a particular orientation, be constructed and operated in a particular orientation, and therefore are not to be construed as a limitation of the present application.

It is to be understood that the terms "first" and "second" are used for descriptive purposes only and should not be read as indicating or implying relative importance or implicitly specifying the number of technical features indicated. Thus, a feature defined with the terms "first", "second" may expressly or implicitly include one or more such features. In the description of the present application, "more", "several" means two or more, unless otherwise expressly and specifically limited.

It should be noted that the terms "mounted", "coupled", "connected" are to be understood in a broad sense, e.g. as a fixed connection, as a detachable connection, or as a connection in one piece; it may be a mechanical or electrical connection; it may be a direct connection or an indirect connection through an intermediate medium, or it may be a connection within two elements.

Figure 1:
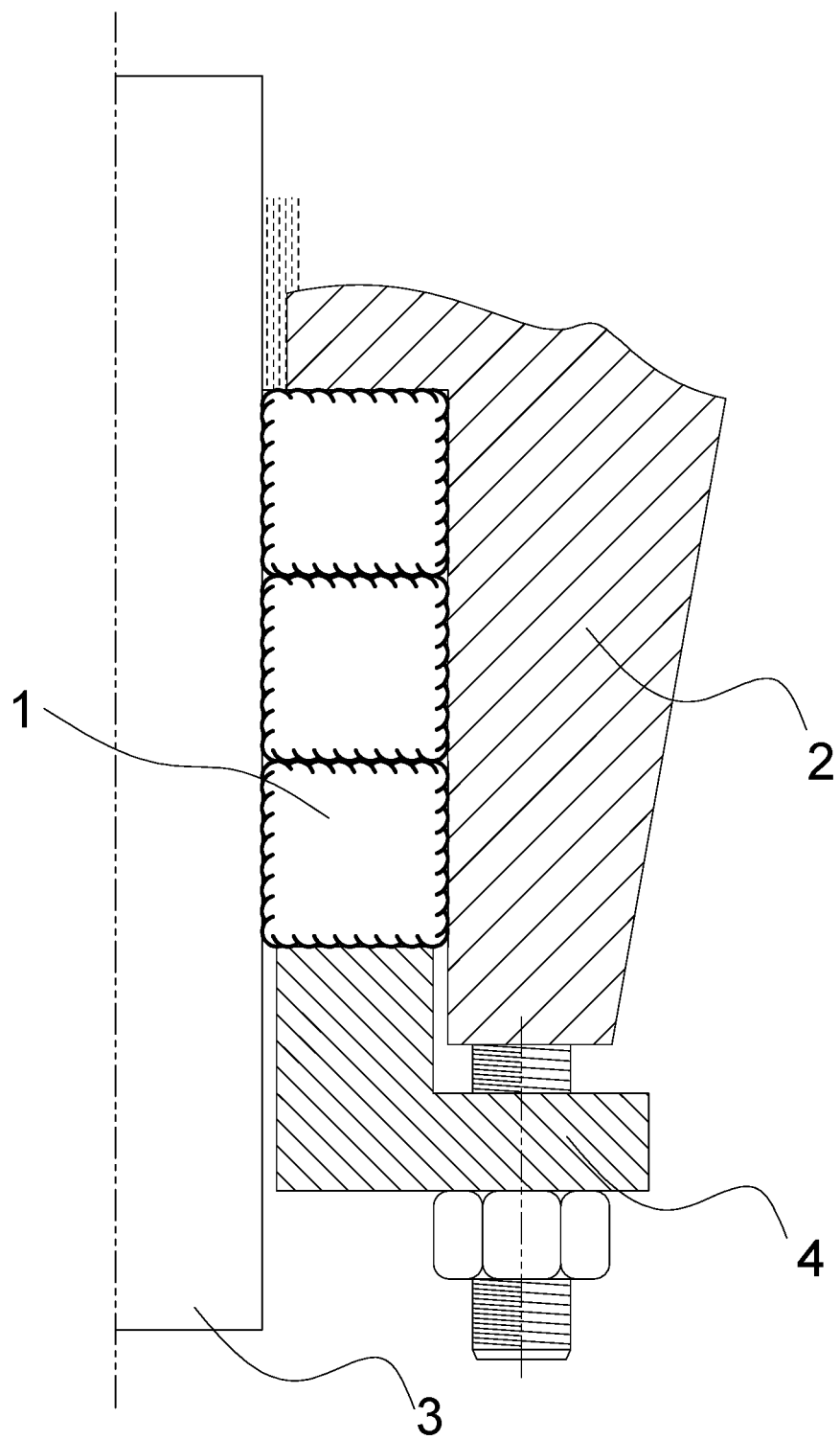
FIG. 1 is a schematic diagram of a sealing packing according to the present application.

FIG. 1 is a schematic view of a sealing packing according to the present application, arranged between an apparatus housing and a drive shaft for forming a seal between the apparatus housing and the drive shaft. As shown in FIG. 1, the sealing packing 1 has a cross-sectional shape of a rounded rectangle (in particular a rounded square), is arranged in a stuffing box between the apparatus housing 2 and the drive shaft 3 and is pressed by means of a stuffing gland 4. The sealing packing 1 has an elasticoplasticity which produces an overall deformation immediately upon application of an external force. The overall deformation consists of an elastic deformation and a plastic deformation. In other words, one part of the deformation of the sealing packing 1 disappears on its own when the external force is released, while another part of the deformation does not disappear on its own. The sealing packing 1 adheres to the surface of the drive shaft 3 by means of the overall deformation, forming a seal. The fit and friction between the sealing packing 1 and the surface of the drive shaft 3 is similar to that of a plain bearing, and therefore sufficient fluid should also be provided for lubrication to ensure the life of the seal produced by the sealing packing 1.

Figure 2:
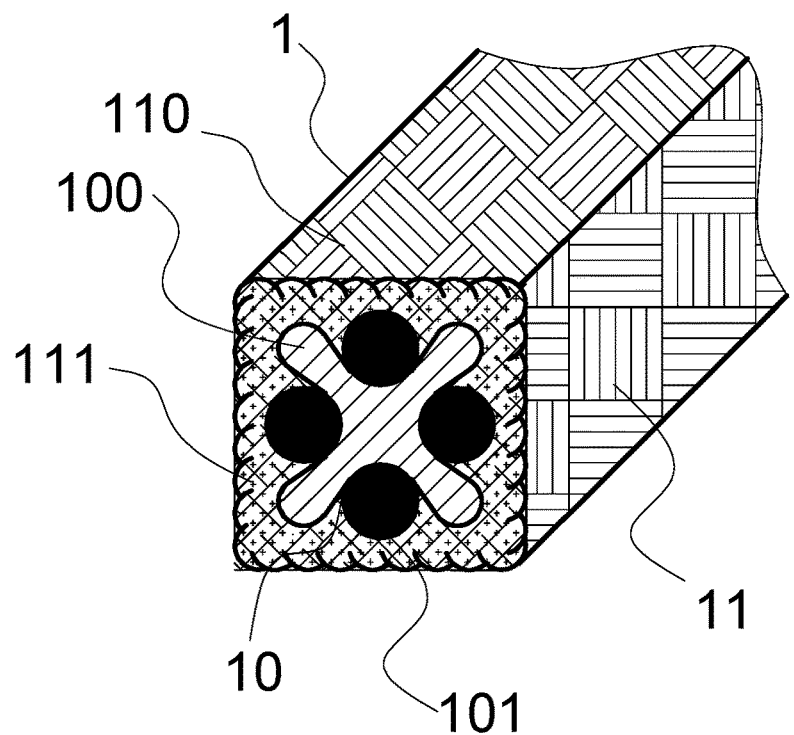
FIG. 2 is a partial sectional perspective view of a sealing packing according to the present application.
Figure 3:
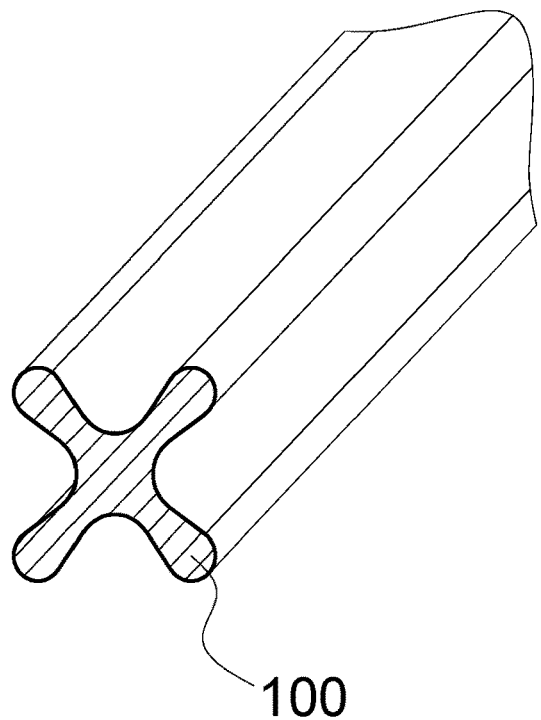
FIG. 3 is a partial sectional perspective view of the central supportive reinforcing core of the sealing packing of FIG. 2.

FIG. 2 is a partial cutaway perspective view of a sealing packing according to the present application. FIG. 3 is a partial sectional perspective view of a central supportive reinforcing core of the sealing packing of FIG. 2. As shown in FIG. 2, the sealing packing 1 includes a core 10, a housing 11, and a lubrication layer. The housing 11 is wrapped around the exterior of the core portion 10 and includes a plurality of fiber threads 110 woven together with each other, and a barrier sealant 111 filled between the plurality of fiber threads 110 and between the core portion 10 and the housing 11 to prevent liquid from seeping into the sealing packing 1. The barrier sealant 111 is made of graphite or polytetrafluoroethylene. The lubrication layer covers the housing 11. The housing 11 and the lubricating layer enable the sealing packing 1 to resist friction at the sealing interface. The abrasion resistant sealing packing 1 maintains an effective seal under high pressure and high speed conditions.

The fiber thread 110 is made of one or more of spandex fibers, carbon fibers, PTFE fibers, plant fibers, graphite fibers. The material of the housing 11 allows the sealing packing 1 to maintain its physical and chemical properties over the temperature range in which it operates. This includes resistance to thermal expansion due to high temperatures or contraction due to low temperatures. The material of the housing 11 also enables the sealing packing 1 to resist corrosion by chemicals to which it may be exposed. This may include the fluid itself, but may also include chemicals used to clean or maintain the equipment.

The plurality of fiber threads 110 woven together creates a plurality of gaps between the sealing packing 1 and the surface of the drive shaft 3 when the sealing packing 1 is pressed against the surface of the drive shaft 3. In other words, the surface of the drive shaft 3 abuts the sealing packing 1 at only a limited number of locations. Liquid is trapped in the plurality of gaps as it attempts to traverse between the sealing packing 1 and the drive shaft 3 for lubrication.

The core portion 10 has a cross-sectional area of 15-75% of the cross-sectional area of the sealing packing 1 and includes a central supportive reinforcing core 100 and a plurality of elastic supplementing cores 101. The central supportive reinforcing core 100 and the plurality of elastic supplementing cores 101 are used together to support the deformation and rebound of the housing 11 under stress.

As shown in FIG. 2, the elastic supplementing core 101 has a circular cross-sectional shape. However, in other embodiments of the present application, the elastic supplementing core 101 may also have other cross-sectional shapes, such as square or oval. As shown in FIG. 3, the central supportive reinforcing core 100 has an X-shaped cross-sectional shape. In other words, the central supportive reinforcing core 100 has a central portion extending along the central axis of the core portion 10 and four support portions extending outwardly from the central portion, each of which is spaced about 90° apart. Viewed in a cross-sectional view, each support portion of the central supportive reinforcing core 100 points toward each corner of the rounded rectangular cross-section of the housing 11. The lines connecting the ends of adjacent support portions of the central supportive reinforcing core 100 are substantially parallel to the outer edge of the sealing packing 1. The support portions of the central supportive reinforcing core 100 extending toward the corners of the housing 11 greatly enhance the resistance of the corners of the sealing packing 1 to deformation under vibration conditions, so that the sealing packing 1 can maintain the original shape of the corners and maintain a seal even under pressure fluctuations, pump shaft runout, or in abrasive media.

The elastic supplementing core 101 is arranged between each two adjacent support portions of the central supportive reinforcing core 100 and is arranged against the two support portions to form, in combination with the central supportive reinforcing core 100, the core portion 10 having a X-shaped cross-sectional shape. Thus, the contact between the elastic supplementing core 101 and the support portions of the central supportive reinforcing core 100 is in the form of line contact or face contact. The combination of the central supportive reinforcing core 100 and the elastic supplementing core 101 allows the sealing packing 1 to have sufficient and good compression resilience performance, which helps the sealing packing 1 to adapt to minor surface irregularities during installation, and also allows the sealing packing 1 to easily form an effective seal when compressed, and maintains a long-lasting seal even when the preload force is low or when the pressure changes.

The central supportive reinforcing core 100 and the elastic supplementing core 101 are made of one material or a combination of materials among silicone rubber, fluorosilicone rubber, polyurethane rubber, fluoroelastomer, ethylene-propylene rubber, nitrile rubber, hydrogenated nitrile rubber, and neoprene rubber, and have different hardnesses from each other. Specifically, the hardness of the central supportive reinforcing core 100 is at least 5 degrees higher than the hardness of the elastic supplementing core 101 in terms of Shore A hardness. The material of the core portion 10 allows the sealing packing 1 to maintain its physical and chemical properties over the temperature range in which it operates. This includes resisting thermal expansion due to high temperatures or contraction due to low temperatures. The material of the core portion 10 also enables the sealing packing 1 to resist corrosion by chemicals to which it may be exposed. This may include the fluid itself, but may also include chemicals used to clean or maintain the equipment.

Figure 4:
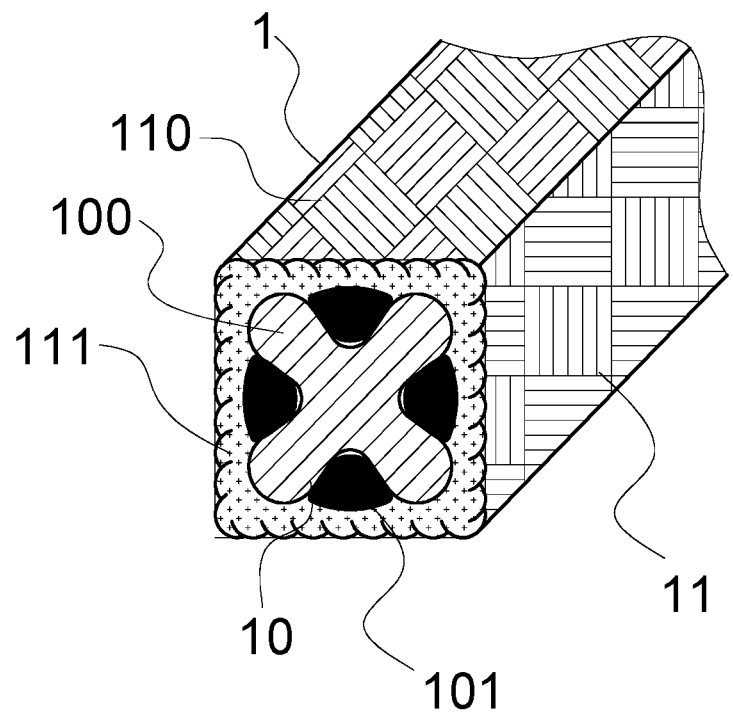
FIG. 4 is a partial cutaway perspective view of a sealing packing according to another embodiment of the present application.
Figure 5:
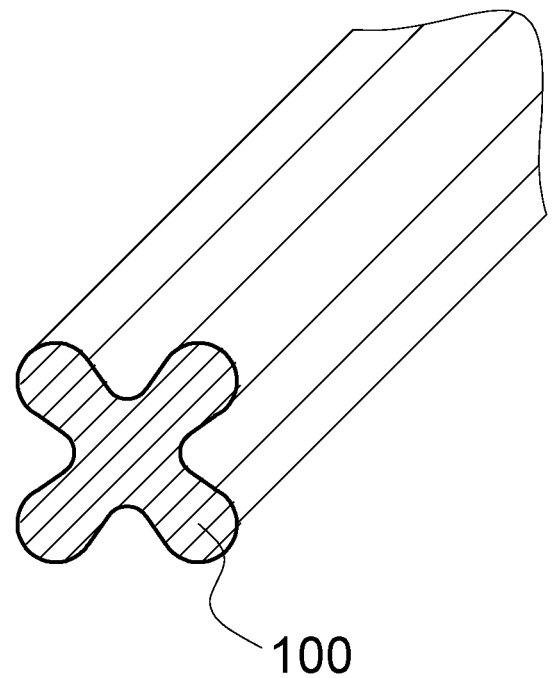
FIG. 5 is a partial sectional perspective view of the central supportive reinforcing core of the sealing packing of FIG. 4.

FIG. 4 is a partial cutaway perspective view of a sealing packing according to another embodiment of the present application. FIG. 5 is a partial sectional perspective view of a central supportive reinforcing core of the sealing packing of FIG. 4. Similar to the sealing packing 1 of FIG. 2, the sealing packing 1 of FIG. 4 includes a core portion 10, a housing 11, and a lubrication layer. The housing 11 is wrapped around the exterior of the core portion 10 and includes a plurality of fiber threads 110 woven together, and a barrier sealant 111 filled between the plurality of fiber threads 110 and between the core portion 10 and the housing 11 to prevent liquid from penetrating the sealing packing 1. The lubrication layer covers the housing 11. The core portion 10 has a cross-sectional area of 15-75% of the cross-sectional area of the sealing packing 1 and comprises a central supportive reinforcing core 100 having a cross-sectional shape of an X-shape and a plurality of elastic supplementing cores 101. The central supportive reinforcing core 100 has a central portion that extends along the central axis of the core portion 10, and four support portions that extend outwardly from the central portion, each of which is spaced about 90° apart. Viewed in a cross-sectional view, each support portion of the central supportive reinforcing core 100 points toward each corner of the rounded rectangular cross-section of the housing 11. The lines connecting the ends of adjacent support portions of the central supportive reinforcing core 100 are substantially parallel to the outer edge of the sealing packing 1. The elastic supplementing core 101 is arranged between each of the two adjacent support portions of the central supportive reinforcing core 100 and abuts the two support portions to form, in combination with the central supportive reinforcing core 100, the core portion 10 having a ·X·-shaped cross-sectional shape. Unlike FIG. 2, the elastic supplementing core 101 in FIG. 4 has a wedge-shaped cross-sectional shape. In other words, the contact area of the elastic supplementing core 101 with the support portion of the central supportive reinforcing core 100 in FIG. 4 is larger than the contact area of the elastic supplementing core 101 with the support portion of the central supportive reinforcing core 100 in FIG. 2. This design can further strengthen the resilience performance of the core portion 10.

Figure 6:
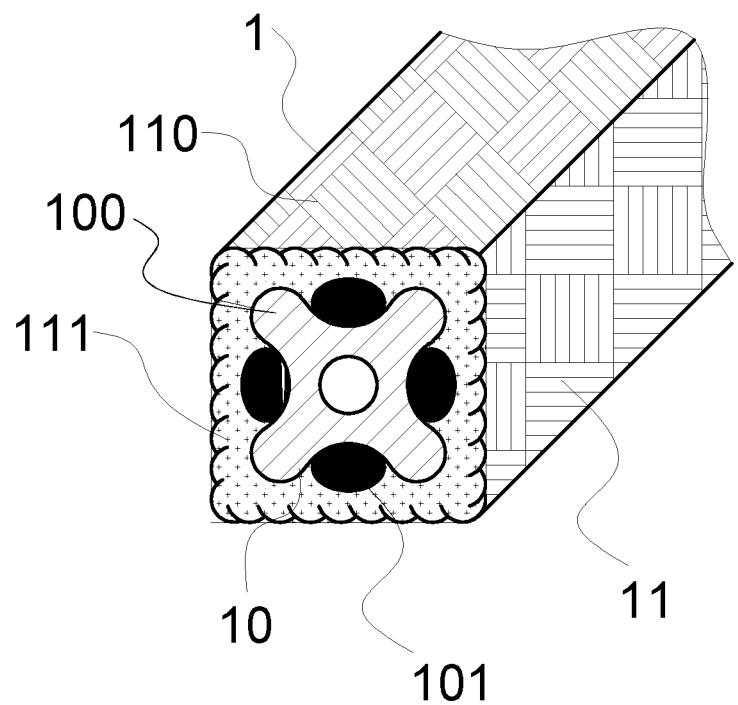
FIG. 6 is a partial cutaway perspective view of a sealing packing according to another embodiment of the present application.
Figure 7:
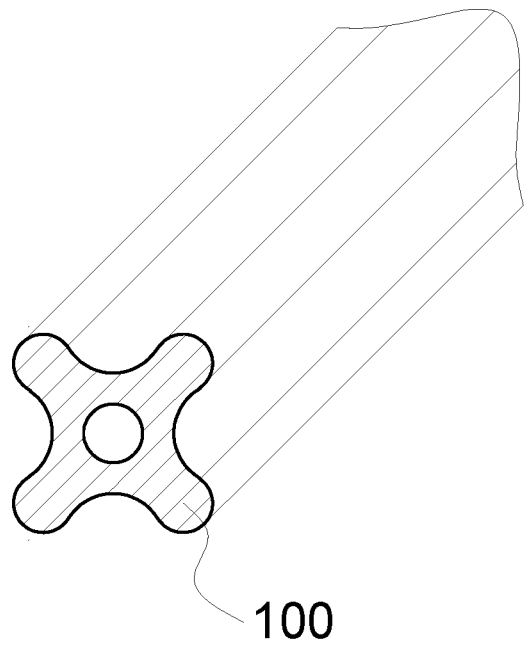
FIG. 7 is a partial sectional perspective view of the central supportive reinforcing core of the sealing packing of FIG. 6.

FIG. 6 is a partial cutaway perspective view of a sealing packing according to another embodiment of the present application. FIG. 7 is a partial sectional perspective view of a central supportive reinforcing core of the sealing packing of FIG. 6. Similar to the sealing packing 1 of FIG. 2, the sealing packing 1 of FIG. 4 includes a core portion 10, a housing 11, and a lubrication layer. The housing 11 is wrapped around the exterior of the core portion 10 and includes a plurality of fiber threads 110 woven together, and a barrier sealant 111 filled between the plurality of fiber threads 110 and between the core portion 10 and the housing 11 to prevent liquid from penetrating the sealing packing 1. The lubrication layer covers the housing 11. The core portion 10 has a cross-sectional area of 15-75% of the cross-sectional area of the sealing packing 1 and comprises a central supportive reinforcing core 100 having a cross-sectional shape of an X-shape and a plurality of elastic supplementing cores 101. The central supportive reinforcing core 100 has a central portion that extends along the central axis of the core portion 10, and four support portions that extend outwardly from the central portion, each of which is spaced about 90° apart. Viewed in a cross-sectional view, each support portion of the central supportive reinforcing core 100 points toward each corner of the rounded rectangular cross-section of the housing 11. The lines connecting the ends of adjacent support portions of the central supportive reinforcing core 100 are substantially parallel to the outer edge of the sealing packing 1. The elastic supplementing core 101 is arranged between each of the two adjacent support portions of the central supportive reinforcing core 100 and abuts the two support portions to combine with the central supportive reinforcing core 100 to form, in combination the with central supportive reinforcing core 100, the core portion 10 having a ·X·-shaped cross-sectional shape. Unlike FIG. 2, the elastic supplementing core 101 of FIG. 6 has an elliptical cross-sectional shape and the center portion of the central supportive reinforcing core 100 has a through-hole that extends along the center axis of the core portion 10. This design further strengthens the malleability of the core portion 10 and allows it to be adapted to drive shafts with smaller diameters.

Figure 8:
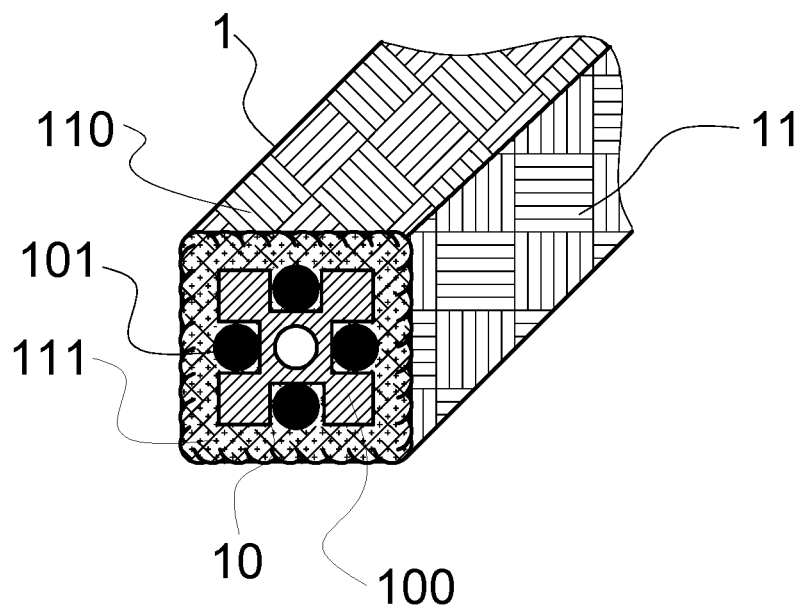
FIG. 8 is a partial cutaway perspective view of a sealing packing according to another embodiment of the present application.

FIG. 8 is a partial sectional perspective view of a sealing packing according to another embodiment of the present application. Similar to the sealing packing 1 of FIG. 6, the sealing packing 1 of FIG. 8 includes a core 10, a housing 11, and a lubrication layer. The housing 11 is wrapped around the exterior of the core portion 10 and includes a plurality of fiber threads 110 woven together, and a barrier sealant 111 filled between the plurality of fiber threads 110 and between the core portion 10 and the housing 11 to prevent liquid from penetrating the sealing packing 1. The lubrication layer covers the housing 11. The core portion 10 has a cross-sectional area of 15-75% of the cross-sectional area of the sealing packing 1 and includes a central supportive reinforcing core 100 having a cross-sectional shape of an X-shape and a plurality of elastic supplementing cores 101 having a cross-sectional shape of a circle. The central supportive reinforcing core 100 has a center portion that extends along the central axis of the core portion 10 and four support portions extending outwardly from the center portion, each of which is spaced about 90° apart. Viewed in a cross-sectional view, each support portion of the central supportive reinforcing core 100 points toward each corner of the rounded rectangular cross-section of the housing 11. The lines connecting the ends of adjacent support portions of the central supportive reinforcing core 100 are substantially parallel to the outer edge of the sealing packing 1. The elastic supplementing core 101 is arranged between each of the two adjacent support portions of the central supportive reinforcing core 100 and resists the two support portions to form, in combination with the central supportive reinforcing core 100, the core portion 10 having a ·X·-shaped cross-sectional shape. The center portion of the central supportive reinforcing core 100 has a through-hole that extends along a central axis of the core portion 10. Unlike FIG. 6, each support portion of the central supportive reinforcing core 100 in FIG. 8 has a rectangular cross-sectional shape. This design reduces the frictional loss of the elastic supplementing core 101 and increases the service life of the sealing packing 1.

In each of the above embodiments, since the cross-sectional shape of the central supportive reinforcing core 100 and the cross-sectional shape of the elastic supplementing core 101 of the core portion 10 of the sealing packing 1 are different, the degree of overall deformation of the sealing packing 1 that would be generated when an external force is applied is also different, thereby enabling the sealing packing 1 according to the present application to be adapted to various application environments.

Figure 9:
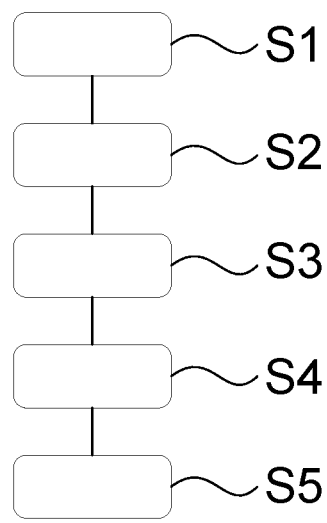
FIG. 9 is a flow chart of a method for preparing a sealing packing according to the present application.

FIG. 9 is a flowchart of a method for preparing a sealing packing according to the present application. The method comprises the following steps:

S1: Combining the central supportive reinforcing core 100 and the elastic supplementing core 101 and pre-treating the fiber thread 110;

S2: Loading the pre-treated fiber thread 110 and the combined central supportive reinforcing core 100 and elastic supplementing core 101 into a machine for braiding, and prefabricating the rope-like structure with the central supportive reinforcing core 100 and the elastic supplementing core 101 as the inner core and the fiber thread 110 as the housing, and reserving a processing allowance;

S3: Impregnating the rope-like structure in step S2 in the barrier sealant 111 then removing for drying;

S4: Loading and braiding the rope-like structure from step S3 to form a sealing packing 1 comprising a core 10 and a housing 11;

S5: Impregnating the sealing packing 1 from step S4 in a lubricant then removing to dry to form a lubricating layer on the exterior of the housing 11.

The preceding description of the embodiments has been provided for illustrative and descriptive purposes. It is not intended to be exhaustive or to limit the embodiments to the variants described. Many modifications and variations will be apparent to those skilled in the art. These embodiments have been selected and described in order to best elucidate the principles and practical applications so that those skilled in the art will be able to understand the embodiments in terms of their various embodiments as well as the various modifications applicable to their intended use. Within the framework of the embodiments, the components and features described above may be combined between different embodiments.

The invention claimed is:

1. A sealing packing for producing a seal between an apparatus housing and a drive shaft, wherein the sealing packing comprises:
   a core portion,
   a housing which is wrapped around the exterior of the core portion and has a rounded rectangular cross-sectional shape, wherein the housing comprises a plurality of fiber threads woven together with each other, and a barrier sealant filled between the plurality of fiber threads and between the core portion and the housing; and
   a lubricating layer which covers the housing, characterized in that
   the core portion has a cross-sectional area of 15-75% of the cross-sectional area of the sealing packing;
   the core portion comprises a central supportive reinforcing core with an X-shaped cross-section and a plurality of elastic supplementing cores that contact the central supportive reinforcing core;
   the central supportive reinforcing core has a central portion extending along the central axis of the core portion and four support portions extending outwardly from the central portion;
   each support portion of the central supportive reinforcing core points to each corresponding corner of the housing.

2. The sealing packing according to claim 1, wherein the lines connecting the ends of adjacent support portions of the central supportive reinforcing core are substantially parallel to the outer edge of the sealing packing.

3. The sealing packing according to claim 1, wherein the elastic supplementing core is arranged between each two adjacent support portions of the central supportive reinforcing core and abuts against these two support portions to form, in combination with the central supportive reinforcing core, the core portion having a X-shaped cross-sectional shape.

4. The sealing packing according to claim 1, wherein the center portion of the central supportive reinforcing core has a through-hole extending along the center axis of the core portion.

5. The sealing packing according to claim 1, wherein the elastic supplementing core has a circular, oval, rectangular, wedge or triangular cross-sectional shape.

6. The sealing packing according to claim 1, wherein the central supportive reinforcing core and the elastic supplementing core have different hardnesses from each other.

7. The sealing packing according to claim 6, wherein the hardness of the central supportive reinforcing core is at least 5 degrees higher than the hardness of the elastic supplementing core in terms of Shore A hardness.

8. The sealing packing according to claim 1, wherein the central supportive reinforcing core is made of one material or a combination of materials of silicone rubber, fluorosilicone rubber, polyurethane rubber, fluoroelastomer, ethylene propylene rubber, nitrile rubber, hydrogenated nitrile rubber, neoprene rubber; and the elastic supplementing core is made of one material or a combination of materials from among silicone rubber, fluorosilicone rubber, polyurethane rubber, fluoroelastomer, ethylene propylene rubber, nitrile rubber, hydrogenated nitrile rubber, neoprene rubber.

9. The sealing packing according to claim 1, wherein the fiber thread is made of one or more of spandex fibers, carbon fibers, PTFE fibers, plant fibers, graphite fibers; and
   the barrier sealant is made of graphite or PTFE.

10. A method for preparing a sealing packing according claim 1, characterized in that the method comprises the steps of:
    Step 1: Combining the central supportive reinforcing core and the elastic supplementing core and pretreating the fiber thread
    Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
    Step 3: Impregnating the rope-like structure in step 2 in the barrier sealant then removing for drying;
    Step 4: Loading and braiding the rope-like structure from step 3 to form a sealing packing comprising a core and a housing;
    Step 5: Impregnating the sealing packing from step 4 in a lubricant then removing to dry to form a lubricating layer on the exterior of the housing.

11. A method for preparing a sealing packing according to claim 2, characterized in that the method comprises the steps of:
    Step 1: Combining the central supportive reinforcing core and the elastic supplementing core and pretreating the fiber thread;
    Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
    Step 3: Impregnating the rope-like structure in step 2 in the barrier sealant then removing for drying;
    Step 4: Loading and braiding the rope-like structure from step 3 to form a sealing packing comprising a core and a housing;
    Step 5: Impregnating the sealing packing from step 4 in a lubricant then removing to dry to form a lubricating layer on the exterior of the housing.

12. A method for preparing a sealing packing according to claim 3, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

13. A method for preparing a sealing packing according to claim 4, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

14. A method for preparing a sealing packing according to claim 5, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

15. A method for preparing a sealing packing according to claim 6, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

16. A method for preparing a sealing packing according to claim 7, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

17. A method for preparing a sealing packing according to claim 8, characterized in that the method comprises the steps of:
  Step 1: Combining the central supportive reinforcing core and the elastic supplementing core and pretreating the fiber thread;
  Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;
  Step 3: Impregnating the rope-like structure in step 2 in the barrier sealant then removing for drying;
  Step 4: Loading and braiding the rope-like structure from step 3 to form a sealing packing comprising a core and a housing;
  Step 5: Impregnating the sealing packing from step 4 in a lubricant then removing to dry to form a lubricating layer on the exterior of the housing.

18. A method for preparing a sealing packing according to claim 9, characterized in that the method comprises the steps of:
  Step 1: Combining the central supportive reinforcing core and the elastic supplementing core and pretreating the fiber thread;

Step 2: Loading the pre-treated fiber thread and the combined central supportive reinforcing core and elastic supplementing core into a machine for braiding, and prefabricating the rope-like structure with the central supportive reinforcing core and the elastic supplementing core as the inner core and the fiber thread as the housing, and reserving a processing allowance;

Step 3: Impregnating the rope-like structure in step 2 in the barrier sealant then removing for drying;

Step 4: Loading and braiding the rope-like structure from step 3 to form a sealing packing comprising a core and a housing;

Step 5: Impregnating the sealing packing from step 4 in a lubricant then removing to dry to form a lubricating layer on the exterior of the housing.

* * * * *